(12) United States Patent
Kahlund et al.

(10) Patent No.: US 11,535,202 B2
(45) Date of Patent: Dec. 27, 2022

(54) CLEANING SYSTEM CONNECTED TO AN AIR SUSPENSION SYSTEM

(71) Applicant: Volvo Car Corporation, Gothenburg (SE)

(72) Inventors: Kristoffer Åhlund Kahlund, Gothenburg (SE); Goran Vasilevski, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 370 days.

(21) Appl. No.: 16/858,782

(22) Filed: Apr. 27, 2020

(65) Prior Publication Data
US 2020/0346624 A1    Nov. 5, 2020

(30) Foreign Application Priority Data
Apr. 30, 2019    (EP) .................................... 19171863

(51) Int. Cl.
| | |
|---|---|
| *B60S 1/54* | (2006.01) |
| *B60G 17/052* | (2006.01) |
| *B60R 1/06* | (2006.01) |
| *B60S 1/56* | (2006.01) |
| *B60G 13/14* | (2006.01) |

(52) U.S. Cl.
CPC ................ *B60S 1/54* (2013.01); *B60G 13/14* (2013.01); *B60G 17/0523* (2013.01); *B60R 1/0602* (2013.01); *B60S 1/548* (2013.01); *B60S 1/56* (2013.01)

(58) Field of Classification Search
CPC ... B60S 1/54; B60S 1/548; B60S 1/56; B60G 13/14; B60G 17/0523; B60G 11/27; B60R 1/0602; B60B 5/02
See application file for complete search history.

(56) References Cited

U.S. PATENT DOCUMENTS

| | | | | |
|---|---|---|---|---|
| 4,673,193 A | * | 6/1987 | Kobayashi | ......... B60G 17/0523 280/124.16 |
| 4,856,815 A | * | 8/1989 | Tanaka | ................. B60G 17/016 280/5.513 |

(Continued)

FOREIGN PATENT DOCUMENTS

WO    20120129521 A1    9/2012

OTHER PUBLICATIONS

Oct. 17, 2019 International Search Report issued on European Application No. 19171863.

*Primary Examiner* — Paul N Dickson
*Assistant Examiner* — Timothy Wilhelm
(74) *Attorney, Agent, or Firm* — Clements Bernard Walker; Christopher L. Bernard

(57) ABSTRACT

A cleaning system connected to an air suspension system. The disclosed subject matter generally relates to a cleaning system for cleaning a surface of a device of a vehicle by means of applying an air jet to the surface. The proposed cleaning system is adapted to be combined with an air suspension system in such a way that the cleaning system receives exhaust air from the air suspension system which air may be used for cleaning of device surfaces. Thus, the proposed cleaning system can receive exhaust air from the air suspension system and apply the air to the device surface via nozzles without the need for a source of air dedicated to the cleaning system.

13 Claims, 3 Drawing Sheets

(56) References Cited

U.S. PATENT DOCUMENTS

| | | | | |
|---|---|---|---|---|
| 5,140,719 | A * | 8/1992 | Cowan | B60S 1/56 |
| | | | | 15/313 |
| 6,173,974 | B1 * | 1/2001 | Raad | B60G 17/0523 |
| | | | | 280/DIG. 1 |
| 7,140,740 | B1 * | 11/2006 | Cooper | B60R 1/0602 |
| | | | | 359/509 |
| 7,311,405 | B2 * | 12/2007 | Irvin | B60R 1/0602 |
| | | | | 359/507 |
| 8,814,190 | B2 * | 8/2014 | Becher | F04B 7/02 |
| | | | | 280/124.16 |
| 9,221,447 | B2 * | 12/2015 | Stoehr | B60T 17/02 |
| 9,527,359 | B2 * | 12/2016 | Son | B62D 61/12 |
| 9,975,582 | B2 * | 5/2018 | Rausch | B62D 33/073 |
| 10,059,280 | B2 * | 8/2018 | Cooper | B60S 1/54 |
| 10,888,890 | B2 * | 1/2021 | Fiebrandt | B05B 1/3006 |
| 2017/0182980 | A1 * | 6/2017 | Davies | B05B 9/04 |
| 2017/0313286 | A1 * | 11/2017 | Galera | B08B 3/02 |
| 2018/0015907 | A1 | 1/2018 | Rice | |
| 2018/0054469 | A1 | 12/2018 | Krishnan | |
| 2018/0354469 | A1 | 12/2018 | Krishnan | |
| 2018/0370474 | A1 | 12/2018 | Krishnan et al. | |
| 2019/0031155 | A1 * | 1/2019 | Mizuno | B08B 3/08 |
| 2019/0077373 | A1 * | 3/2019 | Ghannam | B60R 11/04 |
| 2021/0121900 | A1 * | 4/2021 | Roach | A01M 7/005 |
| 2021/0188215 | A1 * | 6/2021 | Letizio | B08B 3/02 |

\* cited by examiner

CLEANING SYSTEM CONNECTED TO AN AIR SUSPENSION SYSTEM

CROSS-REFERENCE TO RELATED APPLICATION

The present disclosure claims the benefit of priority of co-pending European Patent Application No. 19171863.4, filed on Apr. 30, 2019, and entitled "A CLEANING SYSTEM CONNECTED TO AN AIR SUSPENSION SYSTEM," the contents of which are incorporated in full by reference herein.

TECHNICAL FIELD

The present disclosure relates to a cleaning system adapted to apply an air jet onto a device surface for cleaning. The present disclosure further relates to a method and a control unit for controlling the operation of an interface valve connected between an air suspension system of a vehicle and a compressed air supply of a cleaning system, and to a vehicle.

BACKGROUND

Most modern vehicles have various sensors or other devices arranged on their exterior surfaces. For example, modern vehicles often include exterior sensors adapted for monitoring of the surroundings of the vehicles. Such sensors may be adapted to provide images to the driver for assisting the driver in controlling the vehicle. Other sensors may provide sensing data to electronic control units of the vehicle to enable e.g. semi-autonomous or autonomous control functions in the vehicle.

Sensors and other devices arranged on the exterior surfaces of vehicles are inevitably exposed to contamination due to weather and road conditions, e.g. such contamination may be dirt, road spray, rain, snow salt, dust, to mention a few examples. Exposure to contaminants will lead to sensor or device degradation and consequently to reduced functionality of the sensor or device. This may cause reduced ability for the driver and control functions of the vehicle to take safe and accurate decisions. This is particularly important for autonomous vehicles which base many of their maneuvers on sensor data from exterior sensors monitoring the surrounding environment.

Vehicles are often equipped with separate cleaning devices to alleviate the above issues with contaminants. Some cleaning devices use washer fluid and a pump for applying the washer fluid on the contaminated surfaces via jet nozzles. Other devices operate to apply air on the contaminated surfaces.

However, there is still room for improvement with regards to cleaning functions for exterior devices of vehicles. In particular, there is room for improvements with regards to the integration of the cleaning functionality with other systems of the vehicle.

SUMMARY

The disclosed subject matter generally relates to a cleaning system for cleaning a surface of a device of a vehicle by means of applying an air jet to the surface.

The proposed cleaning system is adapted to be combined with an air suspension system in such a way that the cleaning system receives exhaust air from the air suspension system which air may be used for cleaning of device surfaces. Thus, the proposed cleaning system can receive exhaust air from the air suspension system and apply the received air to the device surface via nozzles without the need for a source of air dedicated to the cleaning system.

More precisely, a compressed air supply of the cleaning system is fluidly connected with at least one nozzle and is configured to provide compressed air to the at least one nozzle. The inventors realized to configure the compressed air supply to receive compressed air from an exhaust of the air suspension system of the vehicle. Accordingly, the inventors realized to recycle air that would otherwise be ejected to the atmosphere, to the cleaning system for the use of cleaning of device surfaces.

With embodiments of the present disclosure, a compressor runtime may be reduced since the air is recycled from another system. The compressor may be part of the cleaning system or more preferred the compressor may be part of the air suspension system. In other words, the compressor may be shared between the cleaning system and the air suspension system.

Additionally, since e.g. the compressor may be shared, there is no need to include an additional compressor specifically dedicated to the cleaning system, thus leading to reduced cost and complexity of the cleaning system.

There is further provided a method for controlling the supply of air to a compressed air supply of a cleaning system in fluid communication with an air suspension system via an interface valve. The air received by the cleaning system from the air suspension system may originate from more than one source in the air suspension system. Therefore, it is evaluated from which source the cleaning system is to receive air.

The evaluation may be based on comparing the pressure in the air supply of the cleaning system to the pressures in the difference sources of the air suspension system.

There is also provided a control unit for controlling the operation of the interface valve and a computer program product.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present disclosure will now be described in more detail, with reference to the appended drawings showing example embodiments of the invention, wherein.

DETAILED DESCRIPTION

Figure 1:
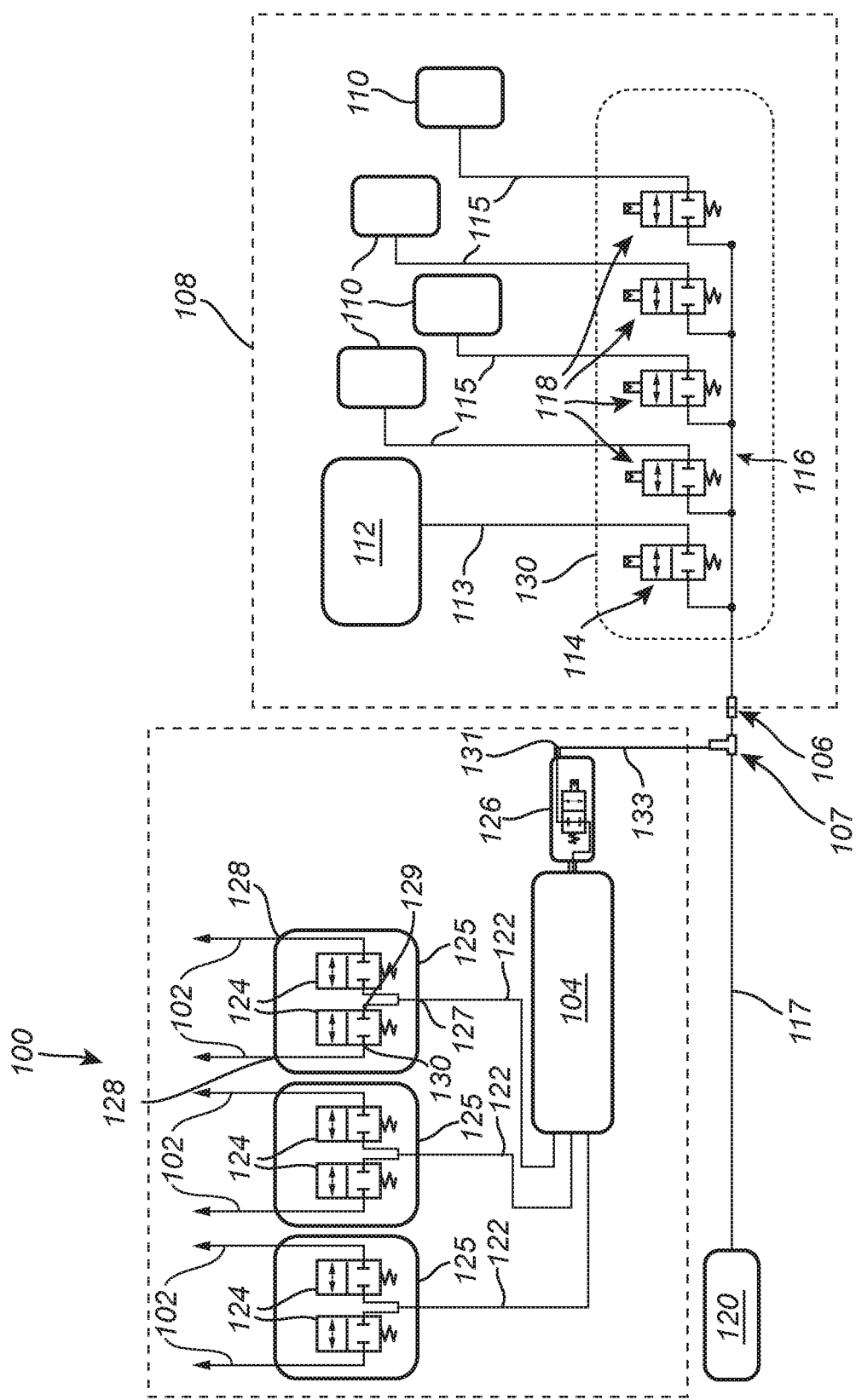
FIG. 1 is a schematic illustration of a cleaning system connected to an air suspension system according to embodiments of the present disclosure.

In the present detailed description, various embodiments of a cleaning system according to the present invention are described. However, this invention may be embodied in many different forms and should not be construed as limited to the embodiments set forth herein; rather, these embodiments are provided for thoroughness and completeness, and to fully convey the scope of the invention to the skilled person. In some instances, well known structures and devices are shown in block diagram form in order to avoid obscuring the novelty of the exemplary embodiments presented herein. Like reference characters refer to like elements throughout.

FIG. 1 conceptually illustrates a cleaning system 100 for cleaning of a surface of a device of a vehicle according to embodiments of the present disclosure. The cleaning system 100 comprises at least one nozzle 102 arranged to apply an air jet onto the device surface. The cleaning system 100 further comprises a compressed air supply 104 fluidly connected with the at least one nozzle 102 and configured to provide compressed air to the at least one nozzle 102. The compressed air supply 104 is configured to receive air from an exhaust 106 of an air suspension system 108 of the vehicle.

The inventors realized that an already present air suspension system of a vehicle may be used as a source for providing compressed air to the cleaning system adapted for cleaning a device surface. An air suspension system exhausts air into the atmosphere during some phases of its operation. This air, or air from other sources of air of the air suspension system may be charged into the cleaning system.

The cleaning system 100 is here conceptually illustrated to be coupled to the air suspension system via a schematic T-connection 107. This T-connection may include further components or functionalities as needed by specific implementations. The T-connection allows for air to flow between the air suspension system 108 and the cleansing system 100.

According to embodiments, the compressed air supply 104 may be configured to receive air from the air suspension system 108 when the air suspension system is operative to lower the vehicle. Lowering the vehicle results in the exhaust of air from the air suspension system. Thus, when the air suspension system 108 lowers the vehicle, bellows 110 of the air suspension system exhausts air. This air may advantageously be used as inlet air into the compressed air supply 104 of the cleaning system 100, instead of it going to waste in the atmosphere.

According to embodiments, the compressed air supply may be configured to receive air from an air tank 112 of the air suspension system 108. For example, the air tank 112 may have an over-pressure, and, instead of exhausting the over pressure air into the atmosphere it may be used by the air cleaning system 100. Further, as a part in enabling the cleaning system 100 to use exhaust air from the air suspension system 108, it is advantageous to be able to use several sources of air form the air suspension system, and not only e.g. air from the bellows 110.

The air tank 112 of the air suspension system 108 may be adapted to provide compressed air to the bellows 110 of the air suspension system via a controllable valve 114 connected between the air tank 112 and the common pressure line 116, and controllable valves 118 connected between the common pressure line 116 and a respective bellow 110. In other words, the air tank 112 is fluidly connected to the common pressure line 116 via pressure line 113 and the valve 114. The bellows 110 are fluidly connected to the common pressure line 116 via respective pressure lines 115 and respective valves 118. The valves 118 are here shown included in a valve block 130.

The controllable valves 118 are individually controllable for releasing or inputting air into the respective bellow 110 for lowering or raising the vehicle. A compressor 120 is fluidly connected to the air tank 112 via pressure line 117 and the controllable valve 114. The compressor 120 may add compressed air to the air tank 112 when the controllable valve 114 is open to thereby provide an open fluid connection between the compressor 120 and the air tank 112, preferably while the controllable valves 118 connected between the common pressure line 116 and the respective bellow 110 are closed.

The compressed air supply 104 of the cleaning system 100 is connected to the nozzles 102 via pressure lines 122 and valves 124. The valves 124 are included in valve units 125 which may include control circuitry, further pressure lines or additional valve components. The cleaning system 100 comprises a valve 124 for each of the nozzles 102. The valves 124 are controllable by a control unit (not shown).

The valves 124 may be solenoid valves which may include pneumatic and electric connections. Here, the valves 124, 118, and 114 are for exemplary purposes illustrated as two port solenoid valves, i.e. having one inlet port 129 and one outlet port 130. The number of solenoid valves in each valve unit 125 may depend on the number of nozzles connected to the solenoid valves. In this example embodiment, each valve unit 125 include one inlet 127 and two outlets 128 connected with the respective nozzles 102. The implementation of controlling the state of such solenoid valves by a control unit is known per se to the skilled person and will not be described in detail herein.

The air suspension system 108 includes a compressor 120 configured to supply compressed air to the air suspension system 108, e.g. for charging the air tank 112 with compressed air. In embodiments, the compressed air supply 104 of the cleaning system 100 is configured to receive compressed air from the air compressor unit 120. Thus, the inventors have further realized that the compressor 120 included in the air suspension system 108 may be used also for providing compressed air to the cleaning system 100, thereby eliminating the need for a separate compressor for the cleaning system 100.

Preferably, the cleaning system 100 comprises an interface valve 126 configured to receive the exhaust air from the air suspension system 108 and to provide the exhaust air to the compressed air supply 104. The interface valve 126 provides for controlling the flow of air from the air suspension system 108 to the cleaning system 100 according to demand and availability of compressed air. To receive air from the exhaust 106, the inlet 131 of the interface valve 126 is connected to the exhaust 106 via a pressure line 133 and the conceptually illustrated T-connection 107.

The interface valve 126 may be responsive to a control signal to open or close a fluid connection between the air suspension system 108 and the compressed air supply 104 of the cleaning system. Accordingly, the interface valve 126 may be opened or closed based on a decision taken elsewhere and that may depend on circumstances other than the need for compressed air.

The control signal may for example be synchronized with the lowering of the vehicle using the air suspension system 108. In other words, it may be evaluated whether compressed air is needed by the cleaning system and based on the status of the air suspension system, the control system may or may not open the interface valve 126 at the same time as the vehicle is lowered.

Another possibility is that the cleaning system 100 may firstly conclude that it needs compressed air, e.g. the pressure in the compressed air supply 104 is below a threshold, whereby the air suspension is controlled to lower the vehicle to thereby exhaust air to the compressed air supply 104 of the cleaning system 100.

By synchronizing the operation of the interface valve 126 with the lowering of the vehicle, the efficiency in using as much as possible of the exhaust gas from the air suspension system in the cleaning system may be improved.

The control signal may alternatively or additionally be synchronized with exhausting air from the air tank 112 of the air suspension system 108. Thus, once it is concluded that the compressed air supply 104 needs additional compressed air, it may be evaluated whether the air tank 112 of the air suspension system 108 may provide air to the compressed air supply 104 of the cleaning system. Accordingly, the air tank 112 provides an additional source of compressed air for the cleaning system which may complement the air from the bellows 110.

Figure 2:
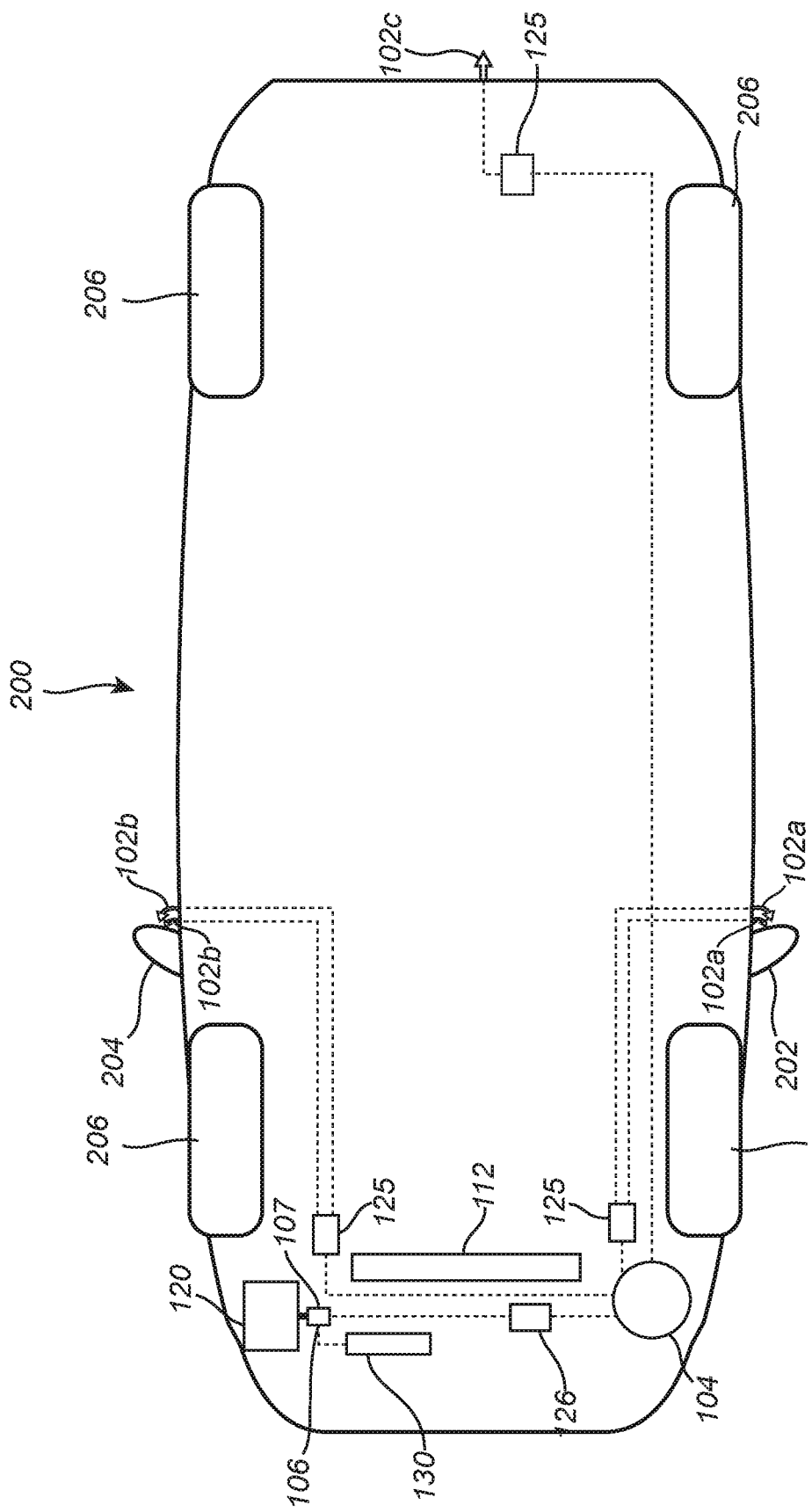
FIG. 2 is schematic illustration of a vehicle including a cleaning system connected to an air suspension system of the vehicle according to embodiments of the present disclosure.

FIG. 2 conceptually illustrates the cleaning system 100 in FIG. 1 comprised in a vehicle 200, here conceptually illustrated from below. As described with reference to FIG. 1, the cleaning system comprises at least one nozzle 102 arranged to apply an air jet onto a device surface. The device of the vehicle may be an exterior device such as a mirror or an exterior sensor of the vehicle such as a camera or Lidar, to mention some examples.

A compressed air supply 104 is fluidly connected with the at least one nozzle 102*a-c* and configured to provide compressed air to the at least one nozzle. The compressed air supply 104 is configured to receive air from an exhaust 106 of an air suspension system of the vehicle. The valves 118 of the air suspension system are here represented by the valve block 130, see also FIG. 1.

The air suspension system of the vehicle comprises a set of suspension bellows configured to provide suspension for the vehicle via the wheels 206. The bellows are caused to release air when lowering the vehicle, the air being directed via air ducts to the compressed air supply 104 of the cleaning system.

The nozzles 102*a* may be arranged to clean a surface of a right-hand mirror 202, the nozzles 102*b* may be arranged to clean a surface of a left-hand mirror 204, and the nozzle 102*c* may be arranged to clean a surface of a tailgate camera (not shown). The nozzles are arranged to point their respective outlet towards the respective device surface to clean. The dashed lines in FIG. 3 represents the various pressure lines described with reference to FIG. 1.

Figure 3:
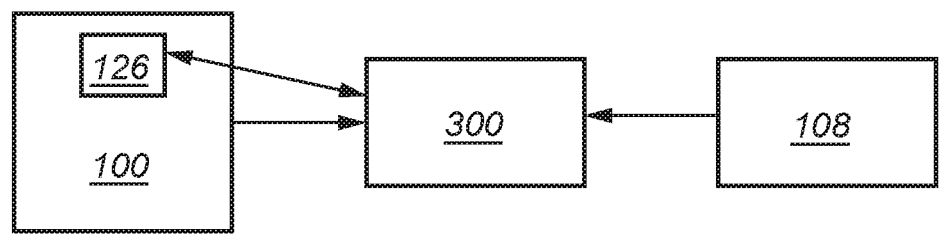
FIG. 3 is a block diagram of a control unit connected to a cleaning system and an air suspension system according to embodiments of the present disclosure.

FIG. 3 is a box diagram illustrating a control unit 300 communicatively connected with an interface valve 126 of a cleaning system 100. The interface valve 126 is fluidly connected between an air suspension system 108 of a vehicle and a compressed air supply of the cleaning system as described with reference to preceding drawings. The control unit 300 is communicatively connected to the interface valve 126 such that it can control the state of the interface valve 126 by transmitting control signals to the interface valve 126. The state of the interface valve 126 is whether it is open, i.e. to allow air through the interface valve 126 into the compressed air supply of the cleaning system, or closed i.e. to not allow air through the interface valve 126 into the compressed air supply of the cleaning system. The control unit 300 may further receive signals from the valves to determine the state of the valve, i.e. whether it is open or closed.

The control unit 300 may be communicatively connected to a pressure sensor of the cleaning system 100 adapted to monitor the pressure in the compressed air supply 104 of the cleaning system. In response to receiving a pressure indication signal indicative of that a pressure in the compressed air supply 104 is below a threshold pressure, evaluate whether the cleaning system should receive air from bellows 110 of the air suspension system, the air suspension air tank 112, or the air suspension compressor 120, or a combination thereof. The control unit 300 may itself determine whether the pressure in the compressed air supply is below the threshold pressure, or the determination may be performed elsewhere.

The control unit 300 is configured to provide a control signal to control the interface valve 126 to open to thereby receive air from the air suspension bellows 110, the air suspension air tank 112, or from the air suspension compressor of the air suspension system 108 based on the evaluation.

To receive air from the selected source, the control unit 300 may control the corresponding valve to be open at the same time as the interface valve 126 is open. For example, with reference to FIG. 1, if the control unit 300 has determined that exhaust air may be received from one or more of the bellows 110, then the respective bellow valve 118 is opened while the interface valve 126 is kept open. If the pressure in the one or more bellows 110 is higher than the pressure in the compressed air, then air will be released from the bellows to the compressed air supply 104. In addition, if the vehicle is to be lowered, then the air in the bellows 110 will be forced out through the exhaust 106 and into the compressed air supply 104, if the respective valves 118 and the interface valve 126 are open. Further, when exhaust air is transferred from the bellows 110 to the compressed air supply 104, the valve 114 between the common pressure line 116 and the air tank 112 of the air suspension system is kept closed.

The control unit 300 may be configured to open the interface valve 126 in response to receiving an indication signal from the air suspension system control unit that the air suspension system is about to lower the vehicle. Thus, the control unit 300 may advantageously take advantage of that the bellows 110 are about to exhaust air through the exhaust 106. In some embodiments, the control unit 300 is the air suspension system control unit, i.e. the control unit 300 may control the air suspension valves 118 connected to the bellows 110 to lower the vehicle in response to various circumstances, and at the same time control the interface valve 126 to open so that the compressed air supply can receive air from the air suspension system exhaust 106.

In some embodiments the control unit 300 may receive a signal from a pressure sensor arranged in the compressed air supply 104 that an air refill is needed in the compressed air supply 104. The control unit 300 may also log the number of activations of the cleaning system, to in this way enable calculations for determining when refill of air in the compressed air supply 104 is needed.

In case the pressure in the bellows 110 is too low or the amount of air in the bellows is insufficient for the compressed air supply, then the control unit 300 may decide to instead use air from the air tank 112 of the air suspension system 108. In such case, if the pressure in the air tank 112 is sufficiently high, e.g. higher than a threshold, then the control unit 300 may control the interface valve 126 to open, and control the air tank valve 114 to open such that air may flow from the air tank 112 of the air suspension system to the compressed air supply 104 via the interface valve 126, the exhaust 106, and the air tank valve 114. Accordingly, the cleaning system advantageously has a redundancy of air sources from which the compressed air supply 104 may be charged.

To further improve the redundancy, the control unit 300 may also control the interface valve 126 to open while controlling the compressor 120 to discharge air. In this case, the valves 114 and 118 may be kept closed such that air from the compressor 120 flows into the compressed air supply 104.

As is understood, the control unit 300 may receive signals from the air suspension system indicative of the pressures in the air tank 112 and the bellows 110, and regarding the state of the valves 118 and 114. The control unit 300 may for this purpose be communicatively connected to the valves 118 and 114, and further communicatively connected to pressure sensors arranged to measure the pressure in the air tank 112 and the bellows 110.

To better choose a suitable source of air depending on the circumstances, the control unit 300 may be connected to a drive system control unit of the vehicle such that it may receive a signal indicative of the present speed of the vehicle. As part of the evaluation performed by the control unit 300, it may compare the present speed of the vehicle to a threshold speed. In response, the control unit 300 is configured to provide the control signal to control the interface valve 126 to open for receiving air from the air suspension air tank 112 when the speed is below a threshold speed. Further in this case, the control unit 300 provides a further control signal to control the air suspension bellows 110 to maintain their present state. Lowering the vehicle using the air suspension system may cause some noise which may be disturbing at low speeds. Therefore, when the vehicle speed is below a threshold, e.g. 50 km/h, 40 km/h, 30 km/h, the control unit may control the interface valve 126 and the air tank valve 112 to open, if the pressure is higher in the air tank valve 112 than in the compressed air supply 104.

In one possible embodiment, a pressure sensor may be arranged to monitor the pressure in the air pressure line 116 of the air suspension system, see FIG. 1. The pressure sensor may thereby be fluidly connected to the air pressure line 116. The interface valve 126 may be kept normal open to have the pressure of the compressed air supply 104 monitored by the pressure sensor connected to the air pressure line 116. When the interface valve 126 is open, the pressures in the pressure line 116 and the compressed air supply are equal. The interface valve 126 may be controlled by the control unit 300 to close for example when the cleansing system is controlled to apply air jets via the nozzles 102. The various implementations with only a single pressure sensor are advantageously cost-effective.

However, it is also possible to use multiple pressure sensors, for example a dedicated pressure sensor for measuring the pressure in the compressed air supply 104 of the cleaning system and a dedicated pressure sensor in the air suspension system. In such case, the control unit 300 may receive pressure data from both the pressure sensors.

Figure 4:
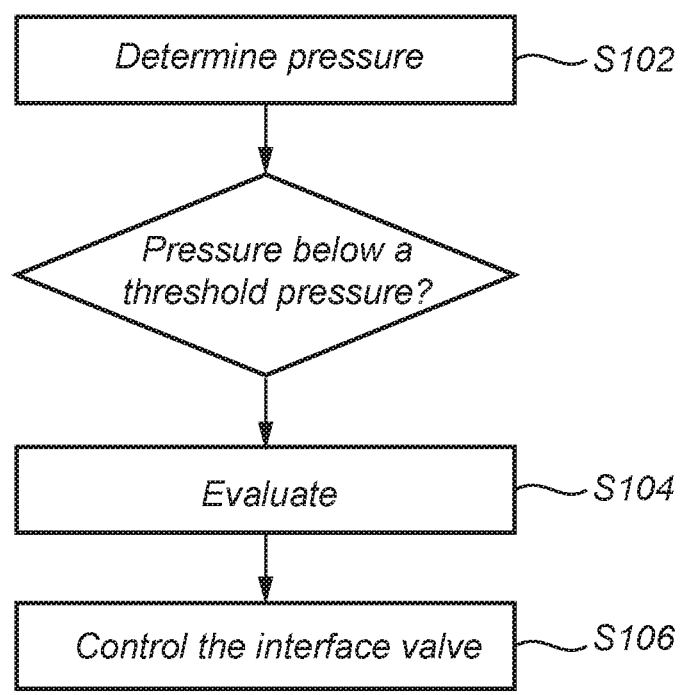
FIG. 4 is a flow-chart of method steps according to embodiments of the present disclosure.

FIG. 4 is a flow-chart of method steps according to embodiments of the present disclosure. The method relates controlling the supply of air to a compressed air supply of a cleaning system in fluid communication with an air suspension system via an interface valve. The method comprising in step S102, determining the pressure in the compressed air supply. The pressure in the compressed air supply may be measure by suitable pressure sensors or gauges known per se in the art.

When the pressure in the compressed air supply is below a threshold pressure, evaluating in step S104 whether to receive air from bellows of the air suspension system, an air tank of the air suspension system, or a compressor of the air suspension system, or a combination thereof. The evaluation may be based on the status of the different components of the air suspension system. For example, if the bellows of the air suspension system is about to release air, then air may be received from the bellows. If the air pressure in the bellows is relatively high, then there may be room for releasing some air to the cleaning system. In some situations, the cleaning system may receive air released from the air tank of the air suspension system. For example, the pressure in the bellows may be too low, or the vehicle cannot be lowered further, whereby air may instead be received from the air tank. Overall several options are available for proving air from the air suspension system to the cleaning system which provides for a versatile means for charging the compressed air supply of the cleaning system.

Subsequently, in step S106, controlling the interface valve to open to thereby receive air from at least one of the bellows of the air suspension system, the air tank of the air suspension system, or the compressor of the air suspension system, based on the evaluation.

The evaluation may be based on comparing the pressure in the compressed air supply of the cleaning system to the pressures in the air suspension bellows and the air suspension air tank. Thus, the decision of from where the exhaust air is to be released may be based on determining which of the bellows or the air tank of the air suspension system has highest pressure or whether the air suspension system is about to the vehicle or is in a position where it may lower the vehicle to thereby release exhaust air.

The communication between the electronic control unit and the valves or other devices may be hardwired or may use other known electrical connection techniques or networks known in the art such as via CAN-buses.

Generally, the compressed air supply of the cleaning system includes an air tank for storing compressed air received from the air suspension system. The stored compressed air may subsequently be provided to the nozzles of the cleaning system via the valves connected between the compressed air supply and the nozzles. Further valves or components necessary for the functionality of the compressed air supply may be included and are considered known per se to the skilled person. For example, additional valves may be included in the compressed air supply for enabling to close the fluid connection between the compressed air supply and the valves included in the valve units.

Generally, a fluid connection is a connection that allow for a flow of a fluid such as air between the components that are fluidly connected.

The term "air" may include variations of atmospheric air. Generally, "air" is herein the gaseous medium that the air suspension system operates with.

The present disclosure also relates to a computer program product comprising a computer readable medium having stored thereon computer program means for controlling the operation of an interface valve connected between an air suspension system of a vehicle and a compressed air supply of a cleaning system. The computer program product comprises code for, in response to receiving a pressure indication signal indicative of that a pressure in the compressed air supply is below a threshold pressure, evaluating whether the cleaning system should receive air from bellows of the air suspension system, the air suspension air tank, or the air suspension compressor, or a combination thereof. The computer program product also comprises code for, providing a control signal to control the interface valve to open to receive air from the air suspension bellows, the air suspension air tank, or from the air suspension compressor based on the evaluation.

It was further realized to provide a combined cleaning and air suspension system comprising a cleaning system according to any one of the herein descried embodiments, and an air suspension system fluidly connected to the cleaning system.

The control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise modules in either hardware or software, or partially in hardware or software and communicate using known transmission buses such as CAN-bus and/or wireless communication capabilities.

Generally, solenoid valves are the preferred valves, although other types of valves are also possible to use with embodiments of the present disclosure and are within the scope of the appended claims.

The pressure lines described herein may include any type of suitable means for transferring compressed air, such as e.g. tubes or pipes of a suitable material. Such pressures lines are known to the skilled person.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A cleaning system for cleaning of a surface of a device of a vehicle, the system comprising:
   at least one nozzle arranged to apply an air jet onto the device surface;
   a compressed air supply fluidly connected with the at least one nozzle and configured to provide compressed air to the at least one nozzle, wherein the compressed air supply is configured to receive air from an exhaust of an air suspension system of the vehicle;
   a pressure sensor arranged to determine a pressure in the compressed air supply; and
   an interface valve connected between the air suspension system and the compressed air supply to receive the air from the exhaust of the air suspension system and to provide the air to the compressed air supply,
   wherein, in response to the pressure sensor detecting that the pressure in the compressed air supply is below a threshold pressure, and in response to an evaluation of whether the cleaning system should receive air from bellows of the air suspension system, an air suspension air tank, an air suspension compressor, or a combination thereof, the interface valve is responsive to open to receive air from the bellows, the air suspension air tank, the air suspension compressor, or the combination thereof based on the evaluation.

2. The cleaning system according to claim 1, wherein the compressed air supply is configured to receive air from the air suspension system when the air suspension system is operative to lower the vehicle which results in the exhaust of air from the air suspension system.

3. The cleaning system according to claim 1, wherein the compressed air supply is configured to receive air from an air tank of the air suspension system.

4. The cleaning system according to claim 1, comprising a valve for each of the nozzles, wherein the nozzles are connected to the compressed air supply via the valves.

5. The cleaning system according to claim 4, wherein each of the valves are individually controllable by a control unit of the vehicle.

6. The cleaning system according to claim 1, wherein the compressed air supply is configured to receive compressed air from an air compressor unit included in the air suspension system for supplying compressed air to the air suspension system.

7. The cleaning system according to claim 1, wherein the control signal is synchronized with at least one of: lowering the vehicle with the air suspension system or exhausting air from an air tank of the air suspension system.

8. A control unit for controlling the operation of the interface valve connected between the air suspension system of the vehicle and the compressed air supply of the cleaning system according to claim 1, the control unit configured to:
   in response to receiving a pressure indication signal indicative that the pressure in the compressed air supply is below the threshold pressure, evaluate whether the cleaning system should receive air from one or more of the bellows of the air suspension system, the air suspension air tank, and the air suspension compressor, and
   provide a control signal to control the interface valve to open to receive the air from the one or more of the air suspension bellows, the air suspension air tank, and the air suspension compressor based on the evaluation.

9. The control unit according to claim 8, wherein the evaluation includes comparing the pressure in the compressed air supply of the cleaning system to the pressures in the air suspension bellows and the air suspension air tank.

10. The control unit according to claim 8, wherein the evaluation includes comparing the present speed of the vehicle to a threshold speed, wherein the control unit is configured to provide the control signal to control the interface valve to open for receiving air from the air suspension air tank when the speed is below a threshold speed, and to provide a further control signal to control the air suspension bellows to maintain their present state.

11. A vehicle comprising the cleaning system according to claim 1, and the air suspension system, wherein when the air suspension system is operative to release air, the released air is received by the compressed air supply of the cleaning system.

12. A computer program product comprising a computer readable medium having stored thereon computer program means for controlling operation of the interface valve connected between the air suspension system of the vehicle and the compressed air supply of the cleaning system according to claim 1, wherein the computer program product comprises:
- code for, in response to receiving a pressure indication signal indicative that the pressure in the compressed air supply is below the threshold pressure, evaluating whether the cleaning system should receive the air from one or more of the bellows of the air suspension system, the air suspension air tank, and the air suspension compressor, and
- code for, providing a control signal to control the interface valve to open to receive the air from the one or more of the air suspension bellows, the air suspension air tank, and the air suspension compressor based on the evaluation.

13. A method for controlling the supply of air to a compressed air supply of a cleaning system in fluid communication with an air suspension system via an interface valve, the method comprising:
- determining the pressure in the compressed air supply;
- when the pressure in the compressed air supply is below a threshold pressure, evaluating whether to receive air from one or more of bellows of the air suspension system, an air tank of the air suspension system, and a compressor of the air suspension system; and
- controlling the interface valve to open to thereby receive air from the one or more of the bellows of the air suspension system, the air tank of the air suspension system, and the compressor of the air suspension system, based on the evaluation.

* * * * *